United States Patent
McGee et al.

(10) Patent No.: US 7,107,956 B2
(45) Date of Patent: Sep. 19, 2006

(54) VEHICLE AND METHOD FOR CONTROLLING ENGINE START IN A VEHICLE

(75) Inventors: Ryan McGee, Ann Arbor, MI (US); Ming Kuang, Canton, MI (US); John Czubay, Troy, MI (US); Fazal Syed, Canton, MI (US); Jonathan Butcher, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 10/710,749

(22) Filed: Jul. 30, 2004

(65) Prior Publication Data

US 2006/0021808 A1 Feb. 2, 2006

(51) Int. Cl.
*F02N 11/08* (2006.01)
*B60K 6/02* (2006.01)

(52) U.S. Cl. .................... 123/179.3; 180/65.2
(58) Field of Classification Search ............. 123/179.3; 180/65.2, 65.3, 65.4, 66.2–66.4; 701/22
See application file for complete search history.

(56) References Cited

U.S. PATENT DOCUMENTS

| | | | |
|---|---|---|---|
| 5,150,034 A | 9/1992 | Kyoukane et al. | |
| 6,118,252 A * | 9/2000 | Richter | 320/132 |
| 6,202,615 B1 * | 3/2001 | Pels et al. | 123/179.3 |
| 6,225,784 B1 | 5/2001 | Kinoshita et al. | |
| 6,232,744 B1 | 5/2001 | Kawai et al. | |
| 6,247,437 B1 * | 6/2001 | Yamaguchi et al. | 123/179.3 |
| 6,331,762 B1 * | 12/2001 | Bertness | 320/134 |
| 6,424,157 B1 | 7/2002 | Gollomp et al. | |
| 6,441,574 B1 | 8/2002 | Phillips et al. | |
| 6,504,327 B1 | 1/2003 | Omata et al. | |
| 6,553,287 B1 | 4/2003 | Supina et al. | |
| 6,583,592 B1 | 6/2003 | Omata et al. | |
| 6,603,215 B1 | 8/2003 | Kuang et al. | |
| 6,831,429 B1 * | 12/2004 | Fu | 318/139 |
| 6,879,888 B1 * | 4/2005 | Ochiai et al. | 701/22 |
| 6,931,318 B1 * | 8/2005 | Kaita et al. | 701/113 |
| 2002/0062183 A1 | 5/2002 | Yamaguchi et al. | |
| 2002/0079147 A1 * | 6/2002 | Yamaguchi et al. | 180/65.2 |
| 2002/0179347 A1 * | 12/2002 | Tamai et al. | 180/65.2 |
| 2003/0088343 A1 * | 5/2003 | Ochiai et al. | 701/22 |
| 2004/0099234 A1 * | 5/2004 | Tamai et al. | 123/179.3 |
| 2004/0249525 A1 * | 12/2004 | Okoshi et al. | 701/22 |

(Continued)

FOREIGN PATENT DOCUMENTS

JP 8061109 3/1996

(Continued)

*Primary Examiner*—Stephen K. Cronin
*Assistant Examiner*—Arnold Castro
(74) *Attorney, Agent, or Firm*—David B. Kelley; Brooks & Kushman

(57) ABSTRACT

A vehicle and method are provided that control engine start in the vehicle. The vehicle includes an electric machine operable to provide a starting torque to the engine. The vehicle also includes a battery capable of providing energy to operate the electric machine. A number of battery parameters are determined, including a discharge power limit, an output power, and an engine starting power level. The engine starting power level is related to the discharge power limit and an amount of output power for the battery necessary to operate the electric machine to provide the starting torque to the engine. When the output power of the battery is at or above the engine starting power level, the engine is automatically started.

22 Claims, 3 Drawing Sheets

U.S. PATENT DOCUMENTS

| | | | |
|---|---|---|---|
| 2004/0254695 A1* | 12/2004 | Komiyama et al. | 701/22 |
| 2005/0061563 A1* | 3/2005 | Syed et al. | 180/65.2 |
| 2005/0257968 A1* | 11/2005 | Egami | 180/65.2 |
| 2005/0263121 A1* | 12/2005 | Tamagawa et al. | 123/179.3 |

FOREIGN PATENT DOCUMENTS

| | | |
|---|---|---|
| JP | 2001003779 | 1/2001 |
| JP | 2003314417 | 11/2003 |

* cited by examiner

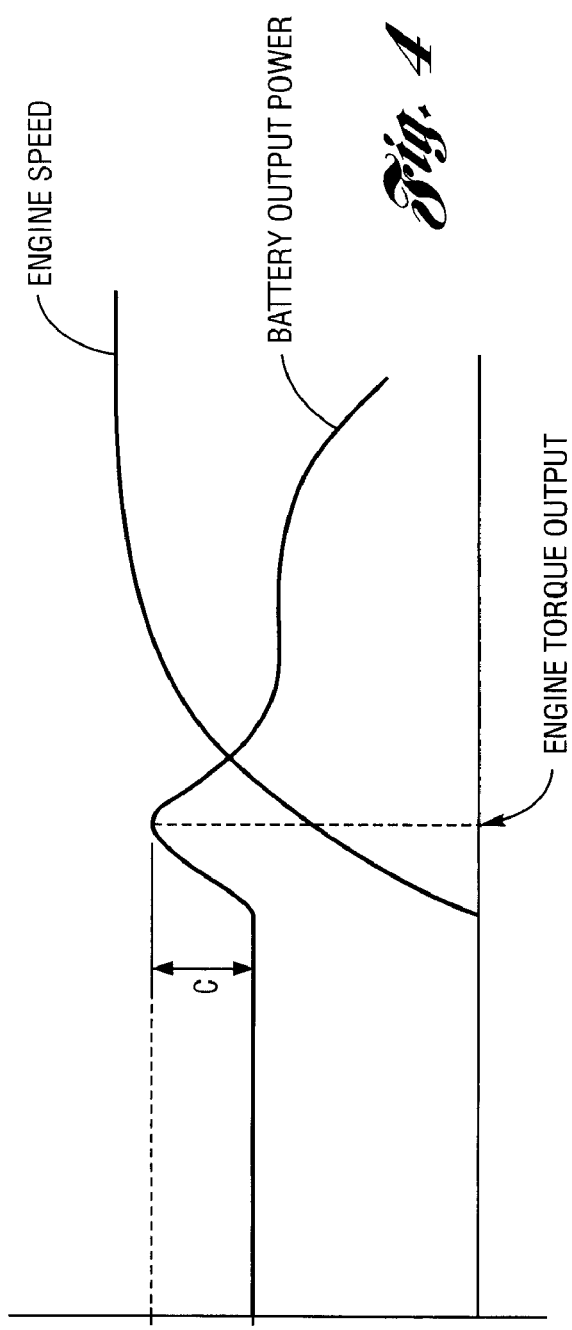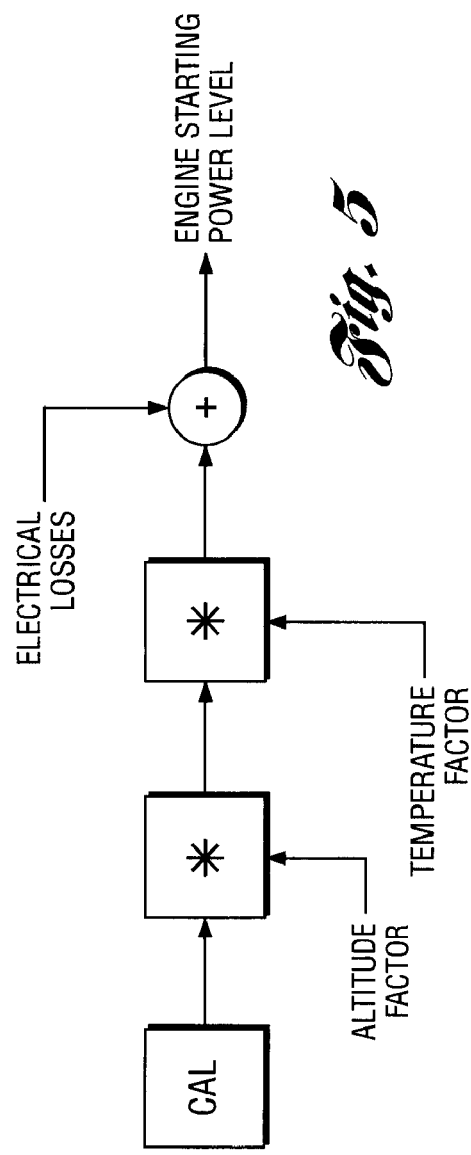

VEHICLE AND METHOD FOR CONTROLLING ENGINE START IN A VEHICLE

BACKGROUND OF INVENTION

1. Field of the Invention

The present invention relates to a vehicle and a method for controlling engine start in a vehicle.

2. Background Art

With the increasing concern for reducing vehicle emissions, hybrid electric vehicles (HEV's) are becoming increasingly popular. One way that an HEV provides reduced emissions, is by shutting off the engine and operating the vehicle with one or more electric motors. The engine is usually shut off during times when vehicle torque requirements are not high. If, for example, the driver demands a torque increase beyond a certain point, the engine may need to be restarted to augment the torque produced by the motor. Thus, while the vehicle is operating, the engine may be started and stopped many times, depending on the operating conditions.

In addition to providing torque for the vehicle wheels, an electric motor in an HEV can be used to start the engine. The motor, which receives power from an electrical storage device, such as a battery, spins the engine until a predetermined speed is reached, whereat fuel is provided to the engine, and the engine begins to produce torque. Because the engine may be stopped and started many times while the vehicle is operating, the engine start should be transparent to the driver. Therefore, the engine should be started such that the amount of torque delivered to the wheels will not be reduced because the state of charge (SOC) of the battery is too low. If the SOC is allowed to drop below a certain point, the amount of torque provided to the vehicle wheels by the motor may need to be reduced in order to provide enough torque to start the engine. This would create a non-transparent engine start, and degrade drivability.

One attempt to deal with this issue is discussed in U.S. Pat. No. 6,424,157 issued to Gollomp et al. on Jul. 23, 2002. Gollomp et al. describes a system and method for monitoring a vehicle battery, including a battery used in an HEV. In the Gollomp et al. system, a computer is preprogrammed with battery performance data taken from external sources. Ambient temperature data is then collected, and maximum current use data for starting current versus measured ambient temperature is calculated. A message can then be provided to a vehicle operator to indicate the amount of time remaining before the battery will not have enough power to start the engine. If the time remaining is less than some predetermined amount of time, the message may appear in the form of a warning.

One limitation of the Gollomp et al. system is that it only provides an indicator of when the battery can no longer start the engine; it does not provide an indicator of when starting the engine will reduce the torque provided to the vehicle wheels. The point at which torque to the vehicle wheels must be reduced may come well before the point at which the battery can no longer provide enough power to start the engine. Therefore, the Gollomp et al. system does not ensure a transparent engine start.

SUMMARY OF INVENTION

One advantage of the present invention is that it provides a vehicle and method for controlling engine start in a vehicle that helps to ensure a transparent engine start that does not degrade drivability.

The invention also provides a method for controlling engine start in a vehicle. The vehicle includes an electric machine operable to provide a starting torque to the engine, and an energy storage device capable of providing energy to operate the electric machine. The method includes determining a discharge power limit for the energy storage device. An output power, and an engine starting power level, for the energy storage device is determined. The engine starting power level is related to the discharge power limit for the energy storage device and an amount of power for the energy storage device necessary to operate the electric machine to provide the starting torque to the engine. The engine is started when the output power of the energy storage device is at or above the engine starting power level.

The invention further provides a method for controlling engine start in a vehicle. The engine includes an electric machine operable to provide a starting torque to the engine, and an energy storage device capable of providing energy to operate the electric machine. The method includes monitoring an output power of the energy storage device. A first output power level for the energy storage device is determined, based at least in part on an amount of output power required by the electric machine to provide the starting torque for the engine. The engine is started when the output power of the energy storage device meets or exceeds the first output power level.

The invention also provides a vehicle, including an engine, an electric machine operable to drive the vehicle and to provide a starting torque to the engine, and an energy storage device capable of providing energy to operate the electric machine. The vehicle also includes at least one controller configured to determine a discharge power limit for the energy storage device and an output power of the energy storage device. The at least one controller is further configured to determine an engine starting power level for the energy storage device and start the engine when the output power of the energy storage device is at or above the engine starting power level. The engine starting power level is related to the discharge power limit for the energy storage device and an amount of power of the energy storage device necessary to operate the electric machine to provide the starting torque to the engine.

BRIEF DESCRIPTION OF DRAWINGS

FIG. 4 is a graph illustrating how an amount of battery output power required to start an engine can be determined; and FIG. 5 is a schematic representation of a function that can be used to determine the engine starting power level.

DETAILED DESCRIPTION

Figure 1:
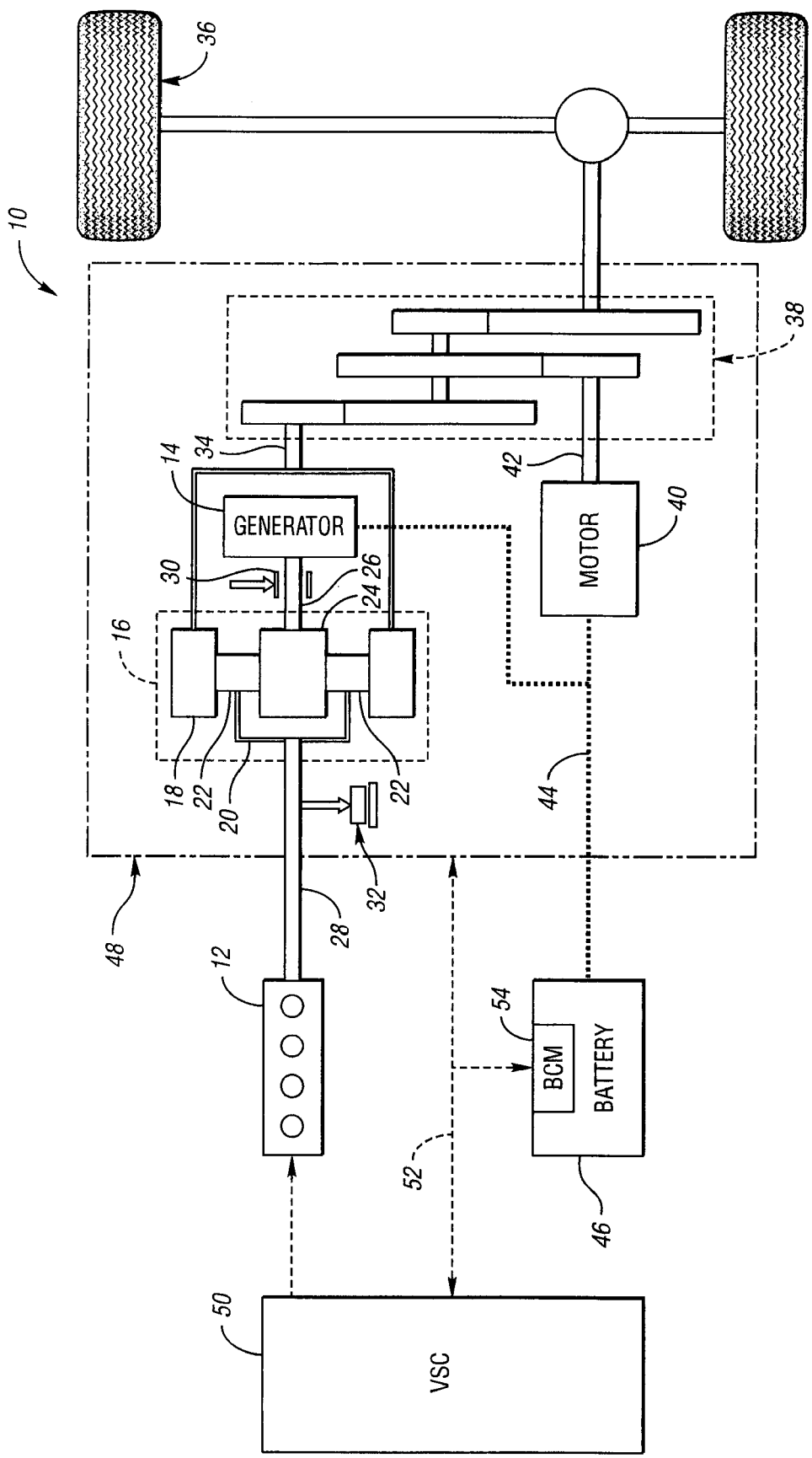
FIG. 1 is a schematic representation of a vehicle in accordance with the present invention.

FIG. 1 shows a schematic representation of a vehicle 10 in accordance with the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. To control the engine 12 and the components of the transaxle 48—i.e., the generator 14 and motor 40—a controller 50 is provided. As shown in FIG. 1, the controller 50 is a vehicle system controller (VSC), and although it is shown as a single controller, it may include multiple controllers. For example, the VSC 50 may include a separate powertrain control module (PCM), which could be software embedded within the VSC 50, or it could be a separate hardware device.

A controller area network (CAN) 52 allows the VSC 50 to communicate with the transaxle 48 and a battery control mode (BCM) 54. Just as the battery 46 has the BCM 54, other devices controlled by the VSC 50 may have their own controllers. For example, an engine control unit (ECU) may communicate with the VSC 50 and may perform control functions on the engine 12. In addition, the transaxle 48 may include one or more controllers, such as a transaxle control module (TCM), configured to control specific components within the transaxle 48, such as the generator 14 and/or the motor 40.

The BCM 54 communicates with the VSC 50 via the CAN 52. The BCM 54 provides information to the VSC 50, such as the temperature, the SOC, and/or other operating conditions of the battery 46. The BCM 54 also communicates to the VSC 50 information such as a discharge power limit for the battery 46. The discharge power limit depends, in part, on the particular battery being used, and as explained below, also depends on the operating conditions of the battery. A battery manufacturer may provide battery data, including discharge power limits for various operating conditions. Typically, the discharge power limit is a power level, beyond which operation of the battery, for some length of time, may damage the battery. Thus, it is generally desirable to keep the output power of a battery, such as the battery 46, at or below the discharge power limit. A graph illustrating the battery output power in relation to the discharge power limit is shown in FIG. 2.

Figure 2:
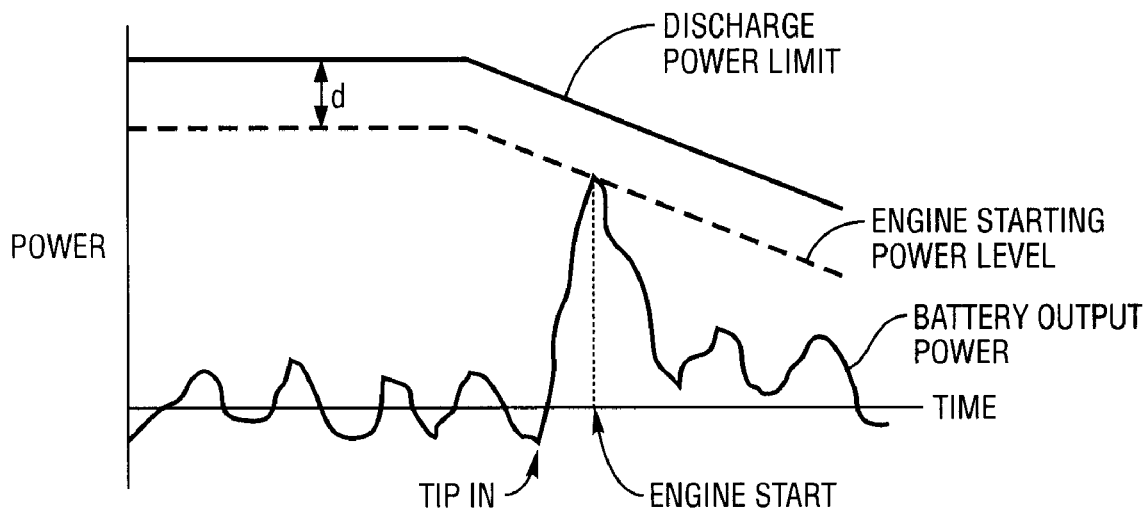
FIG. 2 is a graph illustrating the relationship between battery output power, engine starting power level, and discharge power limit.

As shown in FIG. 2, the discharge power limit is not a constant value, but rather, changes over time as the operating conditions of the battery 46 change. In particular, as the temperature of the batter 46 gets very high or very low, the discharge power limit will be reduced. In addition, as the SOC of the battery 46 decreases, the discharge power limit will also decrease. Conversely, as the temperature of the battery 46 leaves the very hot and very cold ranges, and as the SOC increases, the discharge power limit will also increase. The age of a battery, such as the battery 46, can also affect the discharge power limit. Typically, the discharge power limit will decrease as the battery gets older.

As shown in FIG. 2, the battery output power changes over time based on changes in vehicle operating conditions. For example, when the driver demands a sharp increase in vehicle torque, known as "tip in", the battery output power increases so that the motor 40 and/or generator 14 can provide additional output torque to the vehicle wheels 36. The battery output power also increases as the generator 14 supplies torque to start the engine 12.

The battery output power represented by the curve in FIG. 2, includes the power provided to the motor 40 and/or generator 14, and may also include power provided to other vehicle systems and/or devices. In addition, not all of the power provided to the motor 40 and/or the generator 14 is translated into torque. This is because each of the electric machines 14, 40 has electrical losses associated with its respective operation.

Figure 3:
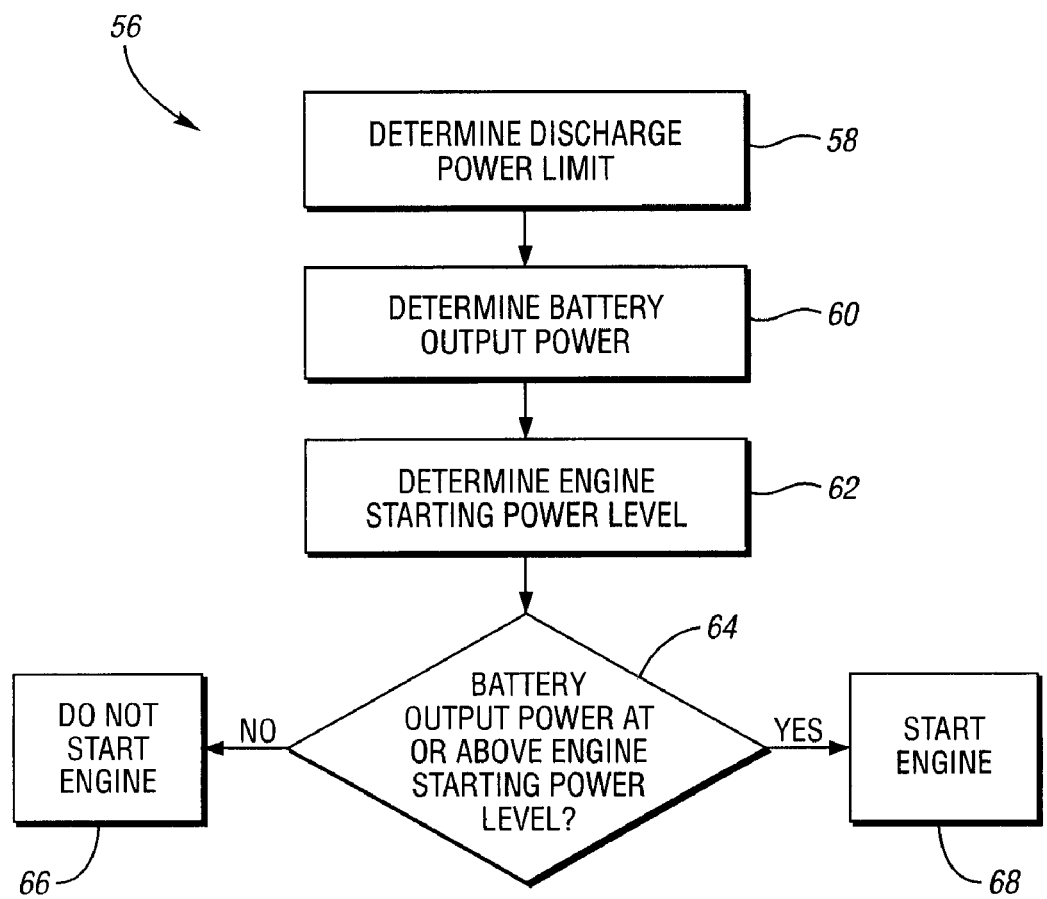
FIG. 3 is a flowchart illustrating a method in accordance with the present invention.

FIG. 3 shows a flow chart 56 illustrating a method in accordance with the present invention. At the outset it is noted that although the steps in the flow chart 56 are shown according to a particular sequence, certain steps may be performed in a different sequence, and even concurrently with other steps. As shown at step 58, the discharge power limit is determined. As described above, the discharge power limit—see FIG. 2—is a variable quantity, dependent on the hardware of the battery 46, as well as its operating state. At step 60, the battery output power is determined. As shown in FIG. 2, the discharge power limit and the battery power output are not merely determined one time, nor are they necessarily determined in any particular sequence. Rather, determination of the discharge power limit and the battery output power is an ongoing process. In particular, the BCM 54 monitors battery conditions and provides information to the VSC 50 at some predetermined interval.

Returning to FIG. 3, it is shown that at step 62 a first output power level, or an "engine starting power level" is determined. The engine starting power level, shown in FIG. 2, may be defined by a predetermined constant value, or it may be a variable value. As described more fully below, the engine starting power level is related to both the discharge power limit and an amount of output power for the battery 46 that is necessary to operate the generator 14 to provide starting torque to the engine 12. Thus, the engine starting power level can provide an indicator of when starting the engine 12—using the generator 14—will cause the battery 46 to reach the discharge power limit. If the discharge power limit is reached during an engine start, a reduction in the torque provided by the generator 14 to the vehicle wheels 36 may be required to bring the battery output power back down below the discharge power limit.

Returning to FIG. 3, it is shown that at decision block 64, it is determined whether the battery output power is at or above the engine starting power level. If it is not, the engine 12 is not started—see step 66. If, however, the battery output power is at or above the engine starting power level, the engine 12 is started—see step 68. Step 68 is illustrated in FIG. 2 at the point that the battery output power curve contacts the engine starting power level curve.

As discussed above, determination of the engine starting power level can be made in a number of different ways. For example, in the embodiment shown in FIG. 2, the engine starting power level is defined by a constant offset, or constant distance (d), from the discharge power limit. Although the distance (d) can be set to any convenient level, it should be large enough so that the battery 46 can supply power to start the engine 12 without reaching the discharge power limit. If the battery output power reaches the discharge power limit as the engine 12 is starting, it may be necessary to reduce the torque provided to the vehicle wheels to reduce the battery output power. As discussed above, this condition is undesirable, as it leads to a non-transparent engine start. Conversely, it is desirable that the distance (d) is not made too large, otherwise the engine 12 may be started too frequently, thereby reducing some of the benefit of operating an HEV.

One method of determining a constant offset—i.e., the distance (d) in FIG. 2—is by operating a vehicle, such as the vehicle 10, under a variety of different conditions, starting the engine under each of these conditions, and measuring the output power of the battery required for engine start. FIG. 4 shows a graph illustrating two curves: engine speed and battery output power. At the point where driver demand increases (tip in), a controller, such as the VSC 50, commands an engine start, and the battery output power begins to increase. The battery output power increases until the engine begins to output torque, at which point the battery output power decreases.

The distance between the battery output power prior to tip in, and the peak battery output power, is shown in FIG. 4 as distance (c). The graph shown in FIG. 4 represents an engine start under one set of operating conditions. Other values for the distance (c) can be determined while the vehicle is operating under a variety of other conditions. For example, the vehicle may be operated at different temperatures, at different altitudes, and with engines having been operated for a different number of hours or over a different number of miles. The values of the distance (c) can then be mathematically combined, for example, by using some statistical technique. In this way, an appropriate offset can be determined, and used as a constant value to determine the engine starting power level. Thus, the offset may be considered a starting power value, which can be programmed into a controller, such as the VSC 50. The VSC 50 can then define the engine starting power level as a difference between the discharge power limit and the offset.

Another way to determine the engine starting power level is to use a variable offset which can be determined by the VSC 50 by implementing a function that uses inputs based on different vehicle operating conditions. For example, FIG. 5 schematically illustrates a function that can be used to determine a variable offset to define the engine starting power level. Initially, a calibratable value (CAL) is defined and programmed into a controller, such as the VSC 50. The calibratable constant (CAL) may represent a nominal amount of battery output power required to start an engine, such as the engine 12. The constant (CAL) is then modified by a factor that considers the altitude at which the vehicle 10 is operating. Because it takes less torque to start an engine at higher altitudes, the altitude factor shown in FIG. 5 decreases as the altitude of the vehicle 10 increases. Thus, there is an inverse relationship between the altitude factor shown in FIG. 5 and the altitude of the vehicle 10. Similarly, there is an inverse relationship between the temperature factor and the temperature of the coolant water of the engine 12. That is, as the coolant temperature decreases, more torque is required to start the engine 12, and therefore, the temperature factor increases. Finally, electrical losses of the generator 14 and/or motor 40 are added in so that the VSC 50 can determine the engine starting power level.

When a variable function, such as the function illustrated in FIG. 5, is used to determine the engine starting power level, the offset—i.e., the distance (d) shown in FIG. 2—will be closer to, or farther away from, the discharge power limit depending on the vehicle operating conditions. Of course, a function, such as the function illustrated in FIG. 5, may include other factors to determine the engine starting power level, or alternatively, may include fewer factors, or different factors, than the ones shown in FIG. 5. When using the function, such as the function illustrated in FIG. 5, the various factors used in implementing the function may be static input values preprogrammed into the VSC 50, or they may be dynamic values. For example, the altitude factor may be determined from a look-up table preprogrammed into the VSC 50, that relates vehicle altitudes to engine starting torque. This look-up table could be programmed into the VSC 50 one time, and relied upon throughout the life of the vehicle 10.

Alternatively, the VSC 50 may employ the use of an adaptive algorithm that replaces values within the look-up table based on actual operating conditions of the vehicle 10. In such a case, the input values used by the function illustrated in FIG. 5, would be dynamic values that would be updated according to the actual operating conditions and measurements taken while the vehicle 10 is operating. The same is true for the other inputs, such as the temperature factor and the electrical losses. In either case, use of a function, such as the function illustrated in FIG. 5, would result in a variable engine starting power level. In the case of using static inputs, the engine starting power level would be determined based on preprogrammed relationships; whereas, using dynamic input values allows the relationships to be updated and tailored to the specific vehicle being operated.

While the best mode for carrying out the invention has been described in detail, those familiar with the art to which this invention relates will recognize various alternative designs and embodiments for practicing the invention as defined by the following claims.

The invention claimed is:

1. A method for controlling engine start in a vehicle, the vehicle including an electric machine operable to provide a starting torque to the engine, and an energy storage device capable of providing energy to operate the electric machine, the method comprising:
   determining a discharge power limit for the energy storage device;
   determining an output power of the energy storage device;
   determining an engine starting power level for the energy storage device, the engine starting power level being less than the discharge power limit for the energy storage device for a given set of conditions, and being related to an amount of output power of the energy storage device necessary to operate the electric machine to provide the starting torque to the engine; and starting the engine when the output power of the energy storage device is at or above the engine starting power level.

2. The method of claim 1, the vehicle further including at least one drive wheel, the method further comprising:

operating the electric machine to provide torque to the at least one vehicle drive wheel, and wherein starting the engine includes operating the electric machine to provide torque to the engine, and wherein the engine starting power level provides an indicator of when starting the engine will reduce the torque provided by the electric machine to the at least one vehicle drive wheel.

3. The method of claim 1, wherein determining the engine starting power level includes defining a power level at a constant offset from the discharge power limit for the energy storage device.

4. The method of claim 3, wherein the constant offset is determined by measuring an output power of an energy storage device used by an electric machine when starting an engine in a vehicle under a plurality of operating conditions, thereby generating a plurality of output power measurements, and combining at least some of the output power measurements to determine the constant offset.

5. The method of claim 1, wherein determining the engine starting power level includes defining a power level at a variable offset from the discharge power limit for the energy storage device, the variable offset being a function of a plurality of vehicle operating conditions.

6. The method of claim 5, wherein the vehicle operating conditions include at least one of a coolant temperature of the engine, an altitude of the vehicle, and electrical losses of the electric machine.

7. The method of claim 5, wherein the function used to determine the variable offset uses static input values based on the vehicle operating conditions.

8. The method of claim 5, wherein the function used to determine the variable offset uses dynamic input values based on the vehicle operating conditions, the dynamic input values being based on measurements taken while the vehicle is operating.

9. The method of claim 1, wherein the discharge power limit for the energy storage device is at least partly based on at least one of the state of charge of the energy storage device, a temperature of the energy storage device, and an age of the energy storage device.

10. A method for controlling engine start in a vehicle, the vehicle including an electric machine operable to provide a starting torque to the engine, and an energy storage device having a discharge power limit and capable of providing energy to operate the electric machine, the method comprising:

monitoring an output power of the energy storage device;

determining a first output power level for the energy storage device that is less than the discharge power limit for a given set of conditions, the first output power level being based at least in part on an amount of output power required by the electric machine to provide the starting torque for the engine; and starting the engine when the output power of the energy storage device meets or exceeds the first output power level.

11. The method of claim 10, wherein the first output power level for the energy storage device is partly based on the discharge power limit for the energy storage device, the discharge power limit for the energy storage device being at least partly based on at least one of the state of charge of the energy storage device, a temperature of the energy storage device, and an age of the energy storage device.

12. The method of claim 11, wherein the first output power level for the energy storage device is set at a constant difference from the discharge power limit for the energy storage device.

13. The method of claim 11, wherein the first output power level for the energy storage device is set at a variable difference from the discharge power limit for the energy storage device, the variable difference being a function of a plurality of vehicle operating conditions.

14. The method of claim 13, wherein the vehicle operating conditions include at least one of a coolant temperature of the engine, an altitude of the vehicle, and electrical losses of the electric machine.

15. The method of claim 13, wherein the function used to determine the variable difference uses static input values based on the vehicle operating conditions.

16. The method of claim 13, wherein the function used to determine the variable difference uses dynamic input values based on the vehicle operating conditions, the dynamic input values being based on measurements taken while the vehicle is operating.

17. A vehicle, comprising:

an engine;

an electric machine operable to drive the vehicle and to provide a starting torque to the engine;

an energy storage device capable of providing energy to operate the electric machine; and at least one controller configured to determine a discharge power limit for the energy storage device and an output power of the energy storage device, the at least one controller being further configured to determine an engine starting power level for the energy storage device that is less than the discharge power limit for a given set of conditions, and start the engine when the output power of the energy storage device is at or above the engine starting power level, the engine starting power level being related to the discharge power limit for the energy storage device and an amount of output power of the energy storage device necessary to operate the electric machine to provide the starting torque to the engine.

18. The vehicle of claim 17, wherein a constant starting power value is preprogrammed into the at least one controller, and the at least one controller defines the engine starting power level as a difference between the discharge power limit for the energy storage device and the constant starting power value.

19. The vehicle of claim 17, wherein the at least one controller determines the engine starting power level for the energy storage device by implementing a function that uses inputs based on a plurality of vehicle operating conditions.

20. The vehicle of claim 19, wherein the vehicle operating conditions include at least one of a coolant temperature of the engine, an altitude of the vehicle, and electrical losses of the electric machine.

21. The vehicle of claim 19, wherein the inputs used by the function are static values based on the vehicle operating conditions.

22. The vehicle of claim 19, wherein the inputs used by the function are dynamic values based on the vehicle operating conditions, the dynamic values being based on measurements taken while the vehicle is operating.

* * * * *